United States Patent
Watanabe

[11] 3,839,868
[45] Oct. 8, 1974

[54] VEHICLE BRAKE APPARATUS
[75] Inventor: Yoshinori Watanabe, Tokyo, Japan
[73] Assignee: Honda Giken Kogyo Kabushiki Kaisha, Tokyo, Japan
[22] Filed: Nov. 27, 1973
[21] Appl. No.: 419,273

[30] Foreign Application Priority Data
Nov. 28, 1972  Japan..........................47/118564

[52] U.S. Cl.................. 60/581, 188/344, 188/345, 188/349
[51] Int. Cl............................................ B60t 11/10
[58] Field of Search...... 60/581, 579, 580; 188/344, 188/345, 349, 106 P; 303/6 C

[56] References Cited
UNITED STATES PATENTS
| | | | |
|---|---|---|---|
| 2,526,968 | 10/1950 | Pontuis | 60/579 |
| 2,984,071 | 5/1961 | Olson et al | 60/580 |
| 3,393,945 | 7/1968 | Reichard | 188/349 |

Primary Examiner—Edgar W. Geoghegan
Assistant Examiner—A. M. Zupcic
Attorney, Agent, or Firm—Waters, Roditi, Schwartz & Nissen

[57] ABSTRACT

Brake apparatus for a vehicle in which a brake oil pressure system for a front wheel and a brake oil pressure system for a rear wheel are provided so as to be individually operable. The arrangement is such that when the two systems are simultaneously operated, the oil pressures of the two systems are combined and then distributed in a predetermined ratio before being applied to the front wheel and the rear wheel, respectively.

5 Claims, 3 Drawing Figures

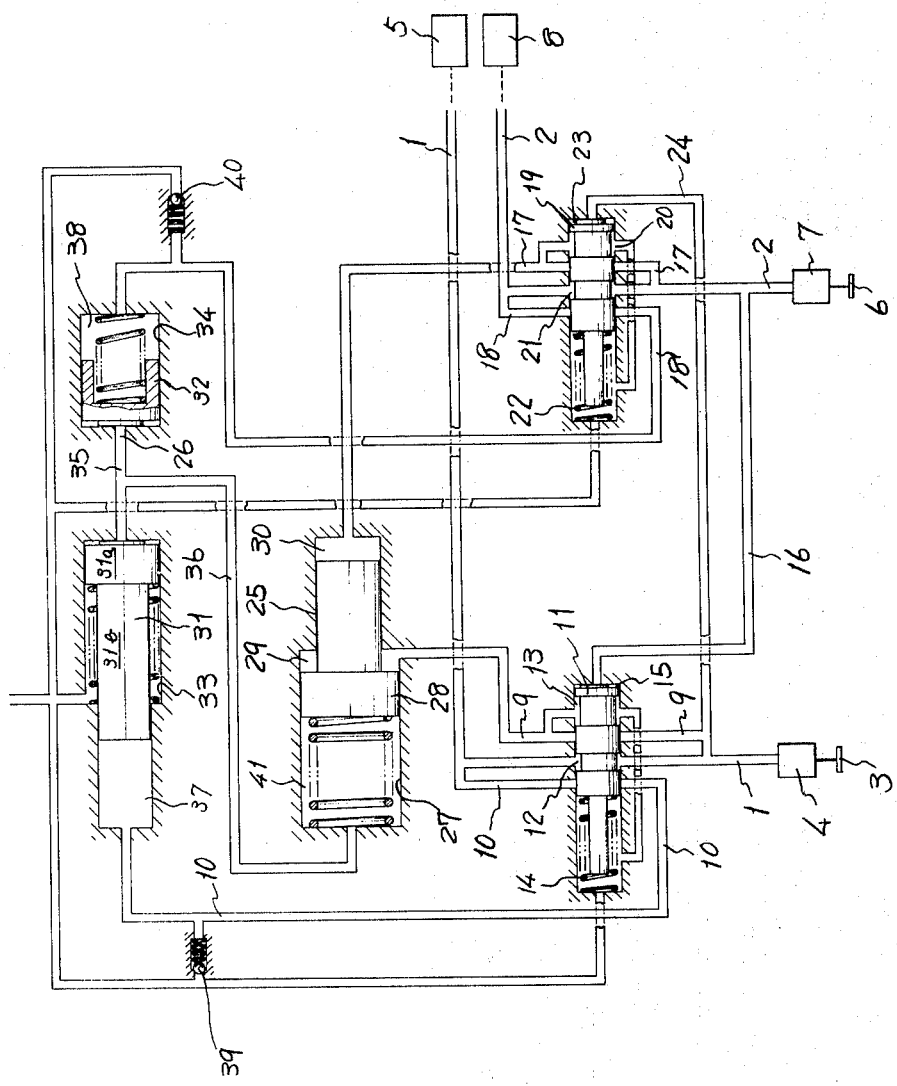

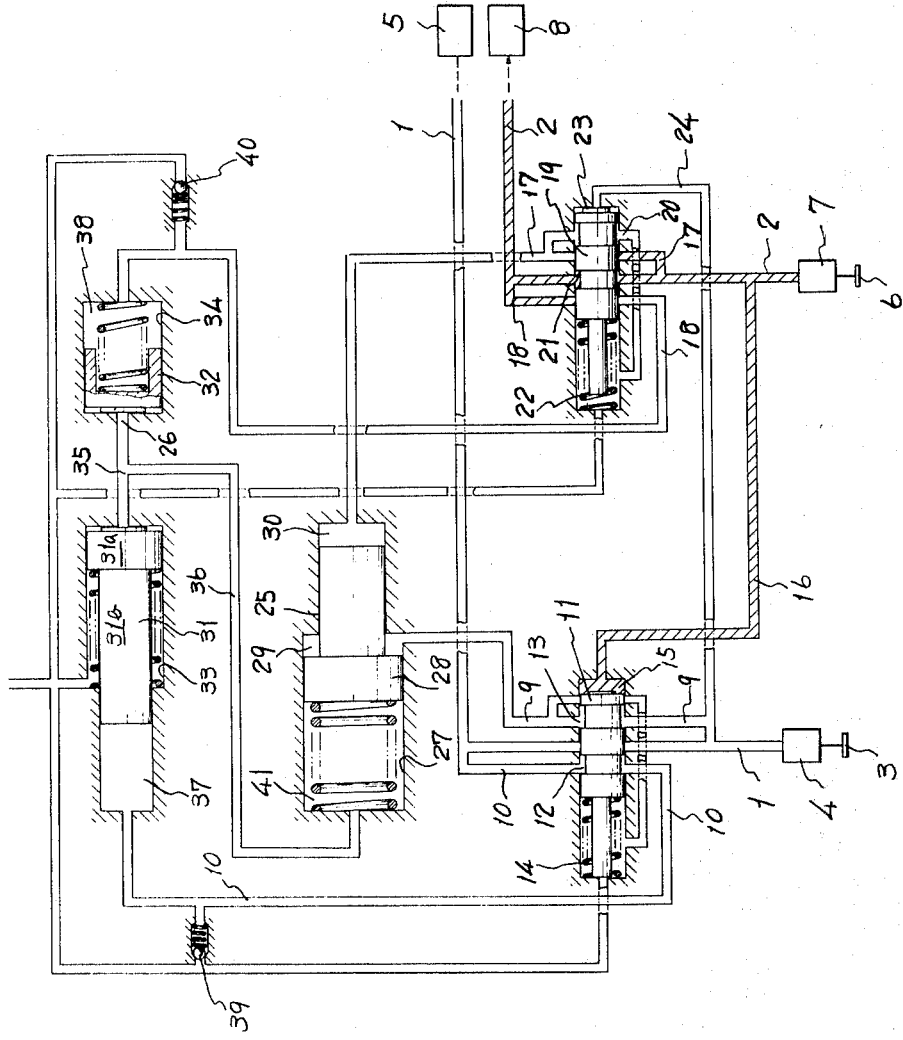

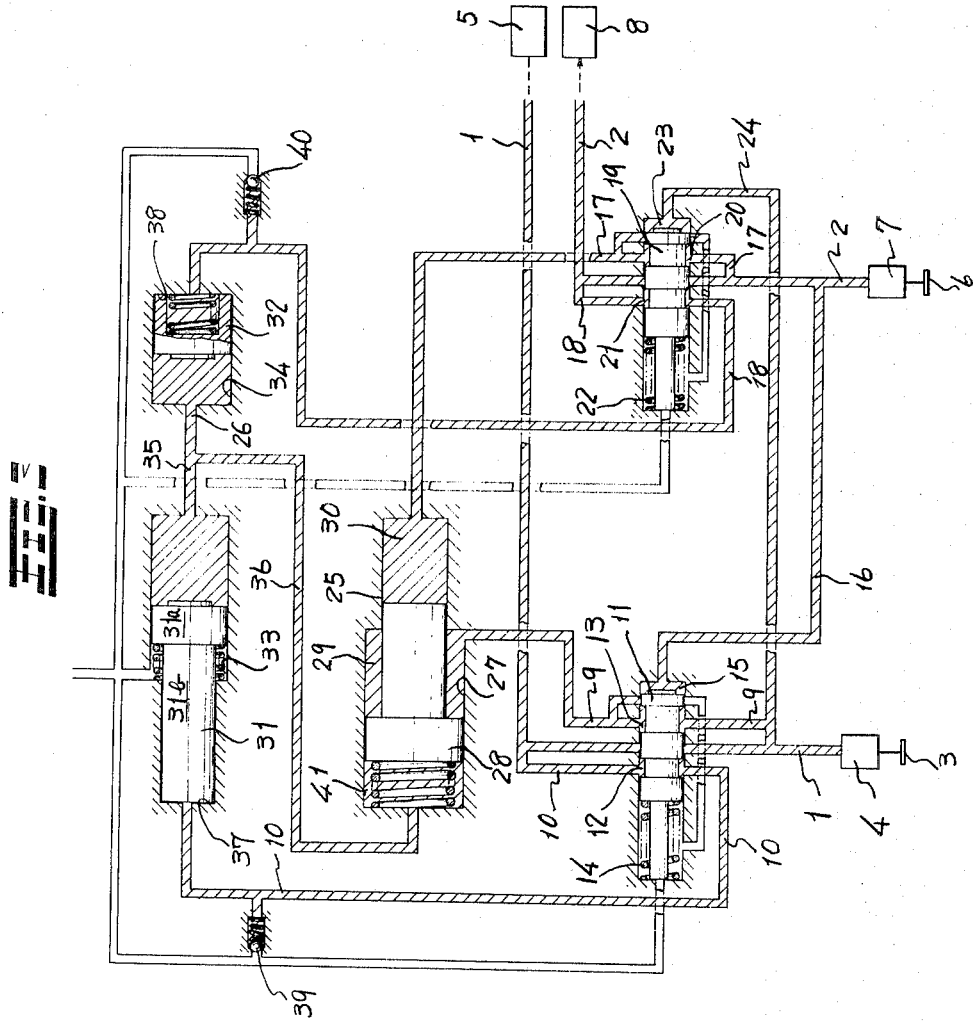

VEHICLE BRAKE APPARATUS

BACKGROUND OF THE INVENTION

This invention relates to brake apparatus chiefly for a two-wheel vehicle such as a motorcycle or the like.

It has been known, heretofore, to provide this kind of vehicle with a brake system for a front wheel and a brake system for a rear wheel so as to be individually operable. It is usual with this arrangement, that when the two systems are simultaneously operated, the front wheel and the rear wheel are simultaneously applied with respective braking forces, but in this case each braking force depends on an actuating force applied to a brake actuator such as a brake lever, a brake pedal, or the like provided at an input end of each system. Accordingly, the two braking forces are not always in a predetermined ratio, and therefore there is danger that, when the two forces are equal, the vehicle body loses balance and falls severely. If, to prevent this, the two braking forces are applied in a predetermined ratio, it is required that the actuating forces applied to the respective actuators be adjusted by the driver himself, and this is considerably troublesome and difficult.

SUMMARY OF THE INVENTION

An object of this invention is to provide apparatus free from the aforementioned defects.

Another object is to provide a brake oil pressure system for a front wheel and a brake oil pressure system for a rear wheel so as to be individually operable, and arranged so that when the two systems are simultaneously operated, the oil pressures of the two systems are combined and then distributed in a predetermined ratio before being applied to the front wheel and the rear wheel, respectively.

One embodying example of this invention will now be explained with reference to the accompanying drawings:

BRIEF DESCRIPTION OF THE DRAWING

FIG. 1 is a circuit diagram of one embodiment, under an inoperative condition, of the present invention;

FIG. 2 is a circuit diagram of the arrangement of FIG. 1 under the condition that a rear wheel system alone is operated; and FIG. 3 is a circuit diagram of the embodiment of FIG. 1 under the condition that a front wheel system and a rear wheel system are simultaneously operated.

DESCRIPTION OF THE PREFERRED EMBODIMENT

Referring to the drawings, reference numerals 1 and 2 denote main circuits constituting a brake oil pressure system for a front wheel and a brake oil pressure system for a rear wheel, respectively. The main circuit 1 has at its input end, a master cylinder 4 with a brake actuator 3 such as a brake lever or the like. Circuit 1 has at its output end, a wheel cylinder 5. In a similar manner, the main circuit 2 has at its input end a master cylinder 7 with a brake actuator 6 such as a brake pedal or the like. At its output end, circuit 2 has a wheel cylinder 8, so that if either of the two actuators 3, 6 is actuated, the oil pressure generated thereby is exerted on the corresponding one of the wheel cylinders 5, 8 through the corresponding one of the main circuits 1, 2, and thus braking action is applied to either one of the front and rear wheels.

The main circuit 1 is provided with a pair of auxiliary circuits 9, 10 extending from the input and output sides thereof, respectively. A single common control valve 11 is interposed in the main circuit 1 and the auxiliary circuits 9, 10, so that by operation of the valve 11, the main circuit 1 and the auxiliary circuits 9, 10 are selectively opened. In particular, the control valve 11 comprises a slidable valve having on its periphery a pair of right and left annular passages 13, 12. Furthermore, the valve is provided at its one end with a spring 14 and at its other end with an oil pressure chamber 15. The oil pressure chamber 15 is in communication with the vicinity of the input end of the other main circuit 2 through a conduit 16, so that in normal operation, the valve 11 is moved to the right by the pushing action of the spring 14 as shown in FIG. 1 and thereby the main circuit 1 brought in its open state. However, when the oil pressure acts on the interior of the oil pressure chamber 15, the valve 11 is pushed thereby to move to the left against the action of the spring 14 as shown in FIG. 2, and thus the auxiliary circuits 9, 10 are brought to their open states. This is also similar in regard to the other main circuit 2. In particular, the main circuit 2 has a pair of right and left auxiliary circuits 17, 18 extending therefrom. The main circuit 2 and the auxiliary circuits 17, 18 are selectively opened by a single common control valve 19. Reference numerals 20, 21 denote a pair of right and left annular passages formed on the periphery of the valve 19. Reference numeral 22 denotes a spring provided on the left side thereof, whereas reference numeral 23 denotes an oil pressure chamber formed on the right side thereof. Reference numeral 24 denotes a conduit for causing the chamber 23 to be in communication with the other main circuit 1.

If the brake actuators 3, 6 are simultaneously actuated, the oil pressures generated in the main circuits 1, 2 are applied to the control valves 19, 11 from the right ends thereof through the conduits 24, 16 for moving those valves 19, 11 to the left in the drawings. These valves 19, 11 serve to close the main circuits 2, 1 and open the auxiliary circuits 17, 18 and the auxiliary circuits 9, 10.

By opening of the auxiliary circuits 9, 10 and 17, 18 the combination and distribution of the oil pressures are effected as described below. The auxiliary circuits 9, 17 are arranged to be in communication with the auxiliary circuits 10, 18 through an oil pressure combining circuit 25 and an oil pressure distribution circuit 26. In particular, the oil pressure combining circuit 25 comprises a stepped piston 28 within a cylinder 27, and the foregoing auxiliary circuits 9, 17 are in communication with a periphery oil pressure chamber 29 and a central oil pressure chamber 30 formed on one side surface of the piston 28. If, thereby, respective oil pressures are applied to the piston 28 through the auxiliary circuits 9, 17, a combined or resultant oil pressure is generated within an oil pressure chamber 41 on the other side surface thereof.

The oil pressure distribution circuit 26 is so constructed that a pair of right and left cylinders 34, 33 containing a pair of right and left pistons 32, 31 are in communication at their inner ends with one another through a conduit 35. This conduit 35 is in communication with the foregoing oil pressure chamber 41 through the conduit 35. Furthermore, oil pressure chambers 37, 38 formed on the opposite outer ends of the two cylinders 33, 34 are in communication with the foregoing auxiliary circuits 10, 18. The left-handed piston 31 is formed of a stepped type piston comprising an inside large diameter piston 31a and an outside small diameter piston 31b. The right-handed piston 32 is formed of a stepless piston equal in diameter to the foregoing large diameter piston 31a. If, thereby, the foregoing resultant oil pressure acts on the two pistons 31, 32 from the inne ends thereof, it is distributed in a ratio of the sectional area of the small diameter piston 31b of the piston 31, to the sectional area of the piston 32. Distributed oil pressures in predetermined ratio are thereby obtained within the outside oil pressure chambers 37, 38, and these oil pressures act on the respective wheel cylinders 5, 8 through the auxiliary circuits 10, 18. Thus, the respective braking forces act on the front wheel and the rear wheel in the predetermined ratio. Reference numerals 39, 40 denote return valves.

In describing the distribution ratio, it is now assumed that the respective operative areas of the inner end surface and the outer end surface of the piston 31 and D and B, and the respective operative areas of the inner end surface and the outer end surface of the piston 32 are D and C. The distribution to the front wheel side and the rear wheel side is in the ratio of D/B to D/C.

In normal operation of the apparatus, the control valves 11, 19 are open for the main circuits 1, 2 as shown in FIG. 1. If, under these conditions, either of the brake actuators 3, 6 is actuated as, for example actuator 6, the oil pressure generated thereby acts on the wheel cylinder 8 of the rear wheel, through the main circuit 2 as shown in FIG. 2 for braking the rear wheel. similar results are obtained when the other of the actuators 3, 6, that is, the actuator 3 is actuated, but in this case the front wheel alone is subjected to braking action. It is apparent from FIG. 2, that in these cases either of the control valves 11, 19 is switched. If, the two actuators, 3, 6 are simultaneously actuated, as shown in FIG. 3, the two control valves 19, 11 are both switched, whereby the main circuits 1, 2 are closed and the auxiliary circuits 9, 10 and 17, 18 are opened. In this manner, the oil pressures generated by actuators 3, 6 are supplied to the oil pressure combining circuit 25 through the auxiliary circuits 9, 17 for producing a combined oil pressure, and the resultant pressure is then distributed by the oil pressure distribution circuit 26 in a predetermined ratio. The distributed oil pressures are taken from the opposite ends thereof and applied to the wheel cylinders 5, 8 through the auxiliary circuits 10, 18, and thus the front wheel and the rear wheel are given respective braking forces of the predetermined ratio.

Thus, according to this invention, the front wheel and the rear wheel can be subjected to braking actions either individually or simultaneously. With simultaneous braking action, the braking forces are always automatically established to be of a predetermined ratio. In this manner, the aforementioned disadvantage of the conventional case where the ratio depends on the driver's actuating forces, can be avoided.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

I claim:

1. Brake apparatus for a vehicle with front wheel means and rear wheel means comprising, in combination, a first brake oil pressure system connected to said front wheel means;

a second brake oil pressure system connected to said rear wheel means; said first system and said second system being individually operable;

and pressure combining and distribution means connected to said first system and said second system for combining and distributing the oil pressures of the two systems in predetermined ratio prior to application to said front wheel means and to said rear wheel means, when the two systems are operated simultaneously.

2. The brake apparatus as defined in claim 1 wherein each said system comprises a main hydraulic circuit with master cylinder and brake actuator.

3. The apparatus as defined in claim 2 including auxiliary circuits connected to said main circuit, and a control valve interposed in said main circuit and auxiliary circuits for selectively opening said auxiliary circuits by operation of said valve.

4. The apparatus as defined in claim 3 wherein said control valve comprises a slidable member having a pair of annular passages on its periphery, spring means at one end of said slidable member, and an oil pressure chamber at the other end of said slidable member and communicating with the other main circuit, said slidable member being displaced by said spring means in normal operation of said valve to open the main circuit.

5. The apparatus as defined in claim 4 including pressure combining means connected to said auxiliary circuits, and pressure distributing means connected to said combining means, the auxiliary circuits of both systems being opened and the pressures generated by both systems being combined by said combining means, the combined pressure from said combining means being distributed by said distributing means in predetermined ratio to said front wheel means and said rear wheel means.

* * * * *